US012711632B2

(12) United States Patent
Toyoshi et al.

(10) Patent No.: US 12,711,632 B2
(45) Date of Patent: Aug. 18, 2026

(54) INFORMATION PROCESSING APPARATUS, INFORMATION PROCESSING METHOD, PROGRAM, AND FLIGHT OBJECT

(71) Applicant: SONY GROUP CORPORATION, Tokyo (JP)

(72) Inventors: Masahiko Toyoshi, Kanagawa (JP); Kohei Urushido, Kanagawa (JP); Shun Lee, Saitama (JP); Shinichiro Abe, Kanagawa (JP); Takuto Motoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/386,915

(22) Filed: Nov. 3, 2023

(65) Prior Publication Data

US 2024/0070873 A1 Feb. 29, 2024

Related U.S. Application Data

(63) Continuation of application No. 17/767,347, filed as application No. PCT/JP2020/038704 on Oct. 14, 2020, now Pat. No. 11,854,210.

(30) Foreign Application Priority Data

Oct. 25, 2019 (JP) ................................ 2019-193922

(51) Int. Cl.
*G06T 7/194* (2017.01)
*G06T 7/30* (2017.01)
(Continued)

(52) U.S. Cl.
CPC ................ *G06T 7/194* (2017.01); *G06T 7/30* (2017.01); *G06V 20/647* (2022.01); (Continued)

(58) Field of Classification Search
CPC . G06T 7/194; G06T 7/30; G06T 2207/10028; G06T 2207/10032;
(Continued)

(56) References Cited

U.S. PATENT DOCUMENTS 11,393,114 B1 * 7/2022 Ebrahimi Afrouzi ........................ G01C 21/3848
11,461,912 B2 10/2022 Matthies et al.
(Continued)

FOREIGN PATENT DOCUMENTS

CN 107145578 A 9/2017
CN 108124489 A 6/2018
(Continued)

*Primary Examiner* — Jennifer Mehmood
*Assistant Examiner* — Pardis Sohraby
(74) *Attorney, Agent, or Firm* — Paratus Law Group, PLLC

(57) ABSTRACT

To enable high-speed autonomous flight of a flight object. A three-dimensional real-time observation result is generated on the basis of self-position estimation information and three-dimensional distance measurement information. A prior map corresponding to a three-dimensional real-time observation result is acquired. The three-dimensional real-time observation result and the prior map are aligned. After the alignment, the three-dimensional real-time observation result is expanded on the basis of the prior map. A flight route is set on the basis of the three-dimensional real-time observation result having been expanded. In the flight object such as a drone, a somewhat long flight route can be accurately calculated at a time in a global behavior plan, which enables high-speed autonomous flight of the flight object.

15 Claims, 5 Drawing Sheets

(51) Int. Cl.
*G06V 20/64* (2022.01)
*B64U 101/30* (2023.01)

(52) U.S. Cl.
CPC ...... *B64U 2101/30* (2023.01); *B64U 2201/10* (2023.01); *G06T 2207/10028* (2013.01); *G06T 2207/10032* (2013.01); *G06T 2207/30181* (2013.01); *G06T 2207/30241* (2013.01)

(58) Field of Classification Search
CPC .......... G06T 2207/30181; G06T 2207/30241; G06V 20/647; B64U 2101/30; B64U 2201/10; G08G 5/0013; G08G 5/0021; G08G 5/0039; G08G 5/0052; G08G 5/0069; G08G 5/0086; G08G 5/045; G08G 5/04; B64C 13/18; G01C 21/20; G01C 21/30
USPC .......................................................... 382/173
See application file for complete search history.

(56) References Cited

U.S. PATENT DOCUMENTS 11,600,022 B2 * 3/2023 Momcilovic ............. G06T 7/73
2015/0279083 A1 * 10/2015 Pradeep .................. G06T 17/00
345/419
2016/0236683 A1 * 8/2016 Eggert .................... G01S 13/86
2017/0337824 A1 11/2017 Chen
2018/0218533 A1 8/2018 Millin et al.
2018/0357796 A1 12/2018 Bishop et al.
2019/0050000 A1 * 2/2019 Kennedy ................ G05D 1/102
2019/0156684 A1 * 5/2019 Pohl ..................... G08G 5/0021
2019/0212752 A1 7/2019 Fong et al.
2019/0241263 A1 * 8/2019 Gu ......................... H04N 23/90
2019/0311533 A1 * 10/2019 Doh .......................... G06T 7/70
2020/0025931 A1 1/2020 Liang et al.
2020/0025935 A1 * 1/2020 Liang ...................... G01S 17/89
2020/0082614 A1 * 3/2020 Xu ......................... G06V 20/17

FOREIGN PATENT DOCUMENTS

CN 109163718 A 1/2019
EP 3056861 A1 4/2020
JP H07-332980 A 12/1995
JP H09062353 A 3/1997
JP 2005-092820 A 4/2005
JP 2007-249632 A 9/2007
JP 2014139538 A 7/2014
JP 2019-045892 A 3/2019
WO WO 2018/073879 A1 4/2018

* cited by examiner

GLOBAL BEHAVIOR PLAN
DESTINATION
30
10
20
LOCAL BEHAVIOR PLAN 10
100
DRONE ONBOARD PC
300
SENSOR UNIT
101
SELF-POSITION ESTIMATION UNIT
THREE-DIMENSIONAL DISTANCE MEASUREMENT UNIT
102
103
REAL-TIME OBSERVATION RESULT MANAGEMENT UNIT
104
ENVIRONMENTAL-STRUCTURE RECOGNITION UNIT
400
EXTERNAL STORAGE
PRIOR-MAP ACQUISITION UNIT
105
106
ALIGNMENT UNIT
107
EXPANSION UNIT
108
GLOBAL-BEHAVIOR PLANNING UNIT
109
LOCAL-BEHAVIOR PLANNING UNIT
200
DRONE CONTROL UNIT

FIG. 5

10A
GLOBAL BEHAVIOR PLAN
DESTINATION
PRIOR MAP
30
10
20
LOCAL BEHAVIOR PLAN

INFORMATION PROCESSING APPARATUS, INFORMATION PROCESSING METHOD, PROGRAM, AND FLIGHT OBJECT

CROSS REFERENCE TO PRIOR APPLICATION

This application is a continuation of U.S. patent application Ser. No. 17/767,347 (filed on Apr. 7, 2022), which is a National Stage patent application of PCT International Patent Application No. PCT/JP2020/038704 (filed on Oct. 14, 2020) under 35 U.S.C. § 371, which claims priority to Japanese Patent Application No. 2019-193922 (filed on Oct. 25, 2019), which are all hereby incorporated by reference in their entirety.

TECHNICAL FIELD

The present technology relates to an information processing apparatus, an information processing method, a program, and a flight object, and particularly to, for example, an information processing apparatus for enabling high-speed autonomous flight of the flight object.

BACKGROUND ART

In order to fly autonomously, a drone as a flight object repeatedly draws a flight route to the destination in accordance with a global behavior plan and flies along the flight route. Because route calculation requires time, it is necessary to calculate a somewhat long route at a time in order to fly at a high speed, and it is also necessary to draw a route for a not-yet observation area. For example, drawing a route assuming that there is nothing in a not-yet observation area has an inconvenience that, for example, a collision occurs when an obstacle suddenly appears in an area unobservable until the last minute.

For example, Patent Document 1 describes a technique of creating an integrated map by superimposing an environmental information map stored in advance and information regarding observed obstacles, and controlling movement of a robot along a predetermined route while avoiding the obstacles on the integrated map. In addition, for example, Patent Document 2 describes a technique of self-position estimation of a vehicle by matching between a registered image included in map data and an observation image captured from the vehicle.

CITATION LIST

Patent Document

Patent Document 1: Japanese Patent Application Laid-Open No. 2007-249632

Patent Document 2: Japanese Patent Application Laid-Open No. 2019-045892

SUMMARY OF THE INVENTION

Problems to be Solved by the Invention

An object of the present technology is to enable high-speed autonomous flight of a flight object.

Solutions to Problems

A concept of the present technology lies in an information processing apparatus including:

- a generation unit configured to generate a three-dimensional real-time observation result on the basis of self-position estimation information and three-dimensional distance measurement information;
- an acquisition unit configured to acquire a prior map corresponding to the three-dimensional real-time observation result;
- an alignment unit configured to align the three-dimensional real-time observation result with the prior map; and
- an expansion unit configured to expand, after the alignment, the three-dimensional real-time observation result on the basis of the prior map.

In the present technology, the generation unit generates the three-dimensional real-time observation result on the basis of the self-position estimation information and the three-dimensional distance measurement information. For example, the three-dimensional real-time observation result may correspond to a three-dimensional occupancy grid map. The acquisition unit acquires the prior map corresponding to the three-dimensional real-time observation result.

The alignment unit aligns the three-dimensional real-time observation result with the prior map. Then, the expansion unit expands the three-dimensional real-time observation result on the basis of the prior map. For example, an environmental-structure recognition unit configured to perform plane detection on the three-dimensional real-time observation result may be included, and the expansion unit may expand, with a result of the plane detection, a plane on the basis of information regarding the prior map. In this case, for example, the environmental-structure recognition unit may further perform semantic segmentation on the three-dimensional real-time observation result, and the expansion unit may expand, with a result of the semantic segmentation, the plane in a case where continuity is present in semantics.

As described above, in the present technology, a three-dimensional real-time observation result is aligned with a prior map, and then the three-dimensional real-time observation result is expanded on the basis of the prior map. Therefore, use of the expanded three-dimensional real-time observation result allows the state of a not-yet observation area to be also grasped in advance, and for example, in a flight object such as a drone, a somewhat long flight route can be accurately calculated at a time in a global behavior plan, which enables high-speed autonomous flight of the flight object.

Further, another concept of the present technology lies in a flight object including:

- a generation unit configured to generate a three-dimensional real-time observation result on the basis of self-position estimation information and three-dimensional distance measurement information;
- an acquisition unit configured to acquire a prior map corresponding to the three-dimensional real-time observation result;
- an alignment unit configured to align the three-dimensional real-time observation result with the prior map;
- an expansion unit configured to expand, after the alignment, the three-dimensional real-time observation result on the basis of the prior map; and
- a behavior planning unit configured to set a flight route on the basis of the three-dimensional real-time observation result having been expanded.

In the present technology, the generation unit generates the three-dimensional real-time observation result on the basis of the self-position estimation information and the three-dimensional distance measurement information. The acquisition unit acquires the prior map corresponding to the three-dimensional real-time observation result. For example, the acquisition unit may acquire the prior map from a different flight object from the flight object through communication. In this case, for example, the prior map may correspond to a map based on the three-dimensional real-time observation result generated by the different flight object.

For example, in this case, the prior map may correspond to a map obtained by processing of cutting the three-dimensional real-time observation result at a certain height and converting the cut three-dimensional real-time observation result into a bird's-eye view. Further, for example, in this case, the prior map may correspond to a map obtained by processing of reducing resolution of the three-dimensional real-time observation result to an extent enabling the communication.

The alignment unit aligns the three-dimensional real-time observation result with the prior map. The expansion unit expands the three-dimensional real-time observation result on the basis of the prior map. Then, the behavior planning unit sets the flight route on the basis of the three-dimensional real-time observation result having been expanded.

For example, an environmental-structure recognition unit configured to perform plane detection on the three-dimensional real-time observation result may be included, and the expansion unit may expand, with a result of the plane detection, a plane on the basis of information regarding the prior map. In this case, for example, the environmental-structure recognition unit may further perform semantic segmentation on the three-dimensional real-time observation result, and the expansion unit may expand, with a result of the semantic segmentation, the plane in a case where continuity is present in semantics.

As described above, in the present technology, a three-dimensional real-time observation result is aligned with a prior map; thereafter, the three-dimensional real-time observation result is expanded on the basis of the prior map; and a flight route is set on the basis of the three-dimensional real-time observation result having been expanded. Therefore, for example, in a flight object such as a drone, a somewhat long flight route can be accurately calculated at a time in a global behavior plan, which enables high-speed autonomous flight of the flight object.

BRIEF DESCRIPTION OF DRAWINGS

FIG. 5 schematically illustrates a state in a case where the drone acquires a prior map from a different drone from the drone through communication.

MODE FOR CARRYING OUT THE INVENTION

Hereinafter, modes for carrying out the invention (hereinafter referred to as "embodiments") will be described. Note that the description will be given in the following order.

1. Embodiments
2. Modifications

1. Embodiments

Figure 1:
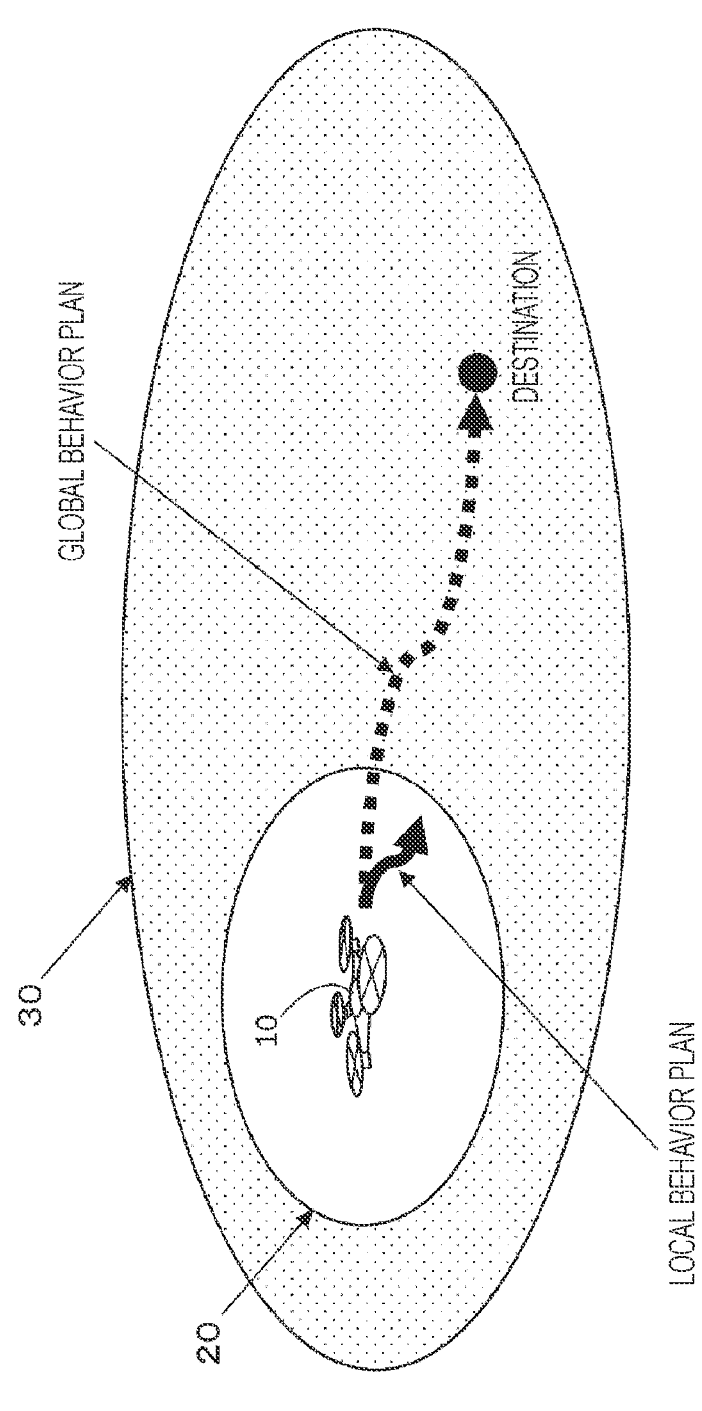
FIG. 1 schematically illustrates an autonomous flight operation of a drone as a flight object.

FIG. 1 schematically illustrates an autonomous flight operation of a drone 10. In an observation area 20, the drone 10 generates a three-dimensional real-time observation result, for example, a three-dimensional occupancy grid map on the basis of self-position estimation information and three-dimensional distance measurement information. Further, the drone 10 expands the three-dimensional real-time observation result on the basis of a prior map (preliminary map) in a not-yet observation area 30. The not-yet observation area 30 includes, for example, an area unobservable due to an obstacle, an area out of the measurement range of a sensor, and the like.

Here, the prior map corresponds to a simple map describing rough information regarding the environment in which the drone 10 flies. For example, the prior map corresponds to a two-dimensional or three-dimensional map on which the position and size of a wall, a building, or the like can be known. More specifically, a two-dimensional or three-dimensional map, a topographic map, a sketch of a building, or the like stored in a server on a cloud corresponds to the prior map.

The prior map may be held in a storage by the drone 10. In order to fly at a high speed, the drone 10 needs to hold a somewhat wide range of a prior map. If the prior map is simple, the data capacity is small, and thus the drone 10 can hold a relatively wide range of the prior map. The prior map is required to be a map on which the rough position and size of an obstacle can be known.

Further, the prior map can be always stored in the server on the cloud, and the drone 10 can download a necessary range of the prior map from the server on the cloud each time and use it. If the prior map is simple, the data capacity is small, and thus downloading can be performed in a short time.

Prior to expansion of the three-dimensional real-time observation result based on the prior map, the drone 10 aligns the three-dimensional real-time observation result with the prior map. In this case, first, the three-dimensional real-time observation result is matched with the dimension of the prior map. For example, in a case where the prior map is two-dimensional, a map with a certain range from the height of this drone 10 is two-dimensionally folded in the three-dimensional real-time observation result. Next, alignment with the map is performed with a well-known alignment technique such as iterative closest points (ICP) or normal distributions transform (NDT).

After the alignment, the drone 10 expands the three-dimensional real-time observation result on the basis of the prior map. A method of such expansion will be described. In this case, if a plane is detected from the three-dimensional real-time observation result and a space corresponding to the plane is found in the prior map, the plane is expanded. Then, in this case, semantic segmentation is further performed on the three-dimensional real-time observation result, and the result of the semantic segmentation is used to expand the plane in a case where continuity is present in semantics. Further use of the result of the semantic segmentation in such a manner can suppress erroneous expansion.

In this case, in a case where a space corresponding to the plane detected from the three-dimensional real-time observation result is found in the prior map and continuity is present in semantics (for example, a wall, road, ground, and building) at the connection portion between the three-dimensional real-time observation result and the prior map related to the plane, the plane detected from the three-dimensional real-time observation result is expanded on the basis of the prior map.

Figure 2:
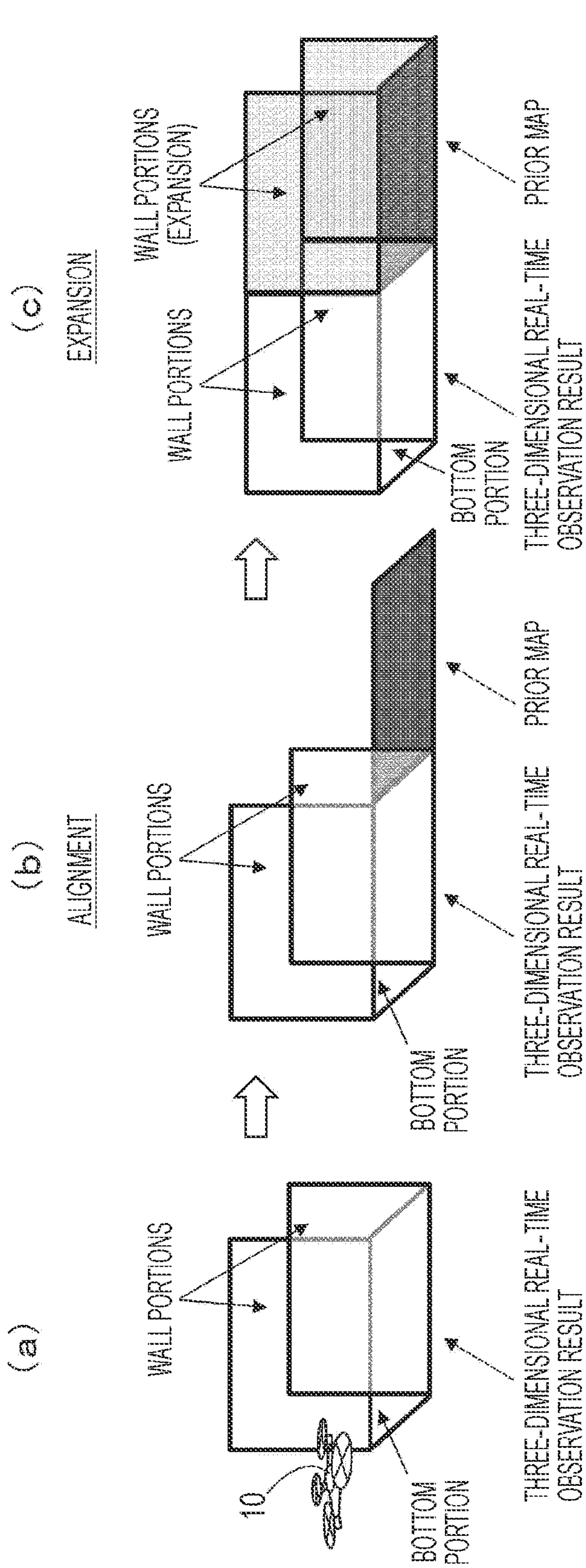
FIG. 2 schematically illustrates the overview of alignment and expansion.

FIG. 2 schematically illustrates the overview of alignment and expansion. FIG. 2(*a*) illustrates a three-dimensional real-time observation result observed by the drone 10. In the illustrated example, a bottom portion and wall portions are present in the three-dimensional real-time observation result.

FIG. 2(*b*) illustrates a state in which the three-dimensional real-time observation result observed by the drone 10 is aligned so as to be matched with a prior map (two-dimensional in the illustrated example). This alignment is performed with a well-known alignment technique such as ICP and NDT as described above. With this alignment, the positional deviation of the wall, road, and others of the three-dimensional real-time observation result is corrected so as to be matched with the prior map.

FIG. 2(*c*) illustrates a state in which the three-dimensional real-time observation result observed by the drone 10 is expanded on the basis of the prior map (two-dimensional in the illustrated example). In this case, the wall portions of the three-dimensional real-time observation result are each detected as a plane and a space corresponding to the plane is present in the prior map. Thus, the wall portions of the three-dimensional real-time observation result are extended to the prior map side, so that the three-dimensional real-time observation result is expanded.

Note that, in this case, it is assumed that the semantics of the bottom portion of the three-dimensional real-time observation result is determined by semantic segmentation, the semantics is the same as that of the space portion of the prior map subsequent thereto, and the continuity of the semantics is confirmed.

Referring back to FIG. 1, the drone 10 makes a global behavior plan on the basis of the expanded three-dimensional real-time observation result, and sets a flight route to the destination. Then, in order to fly along the flight route 40, the drone 10 creates control information necessary for the flight as a local behavior plan. The control information includes information such as speed and acceleration of the drone 10, and further includes corrected route information based on obstacle determination.

"Exemplary Configuration of Drone"

Figure 3:
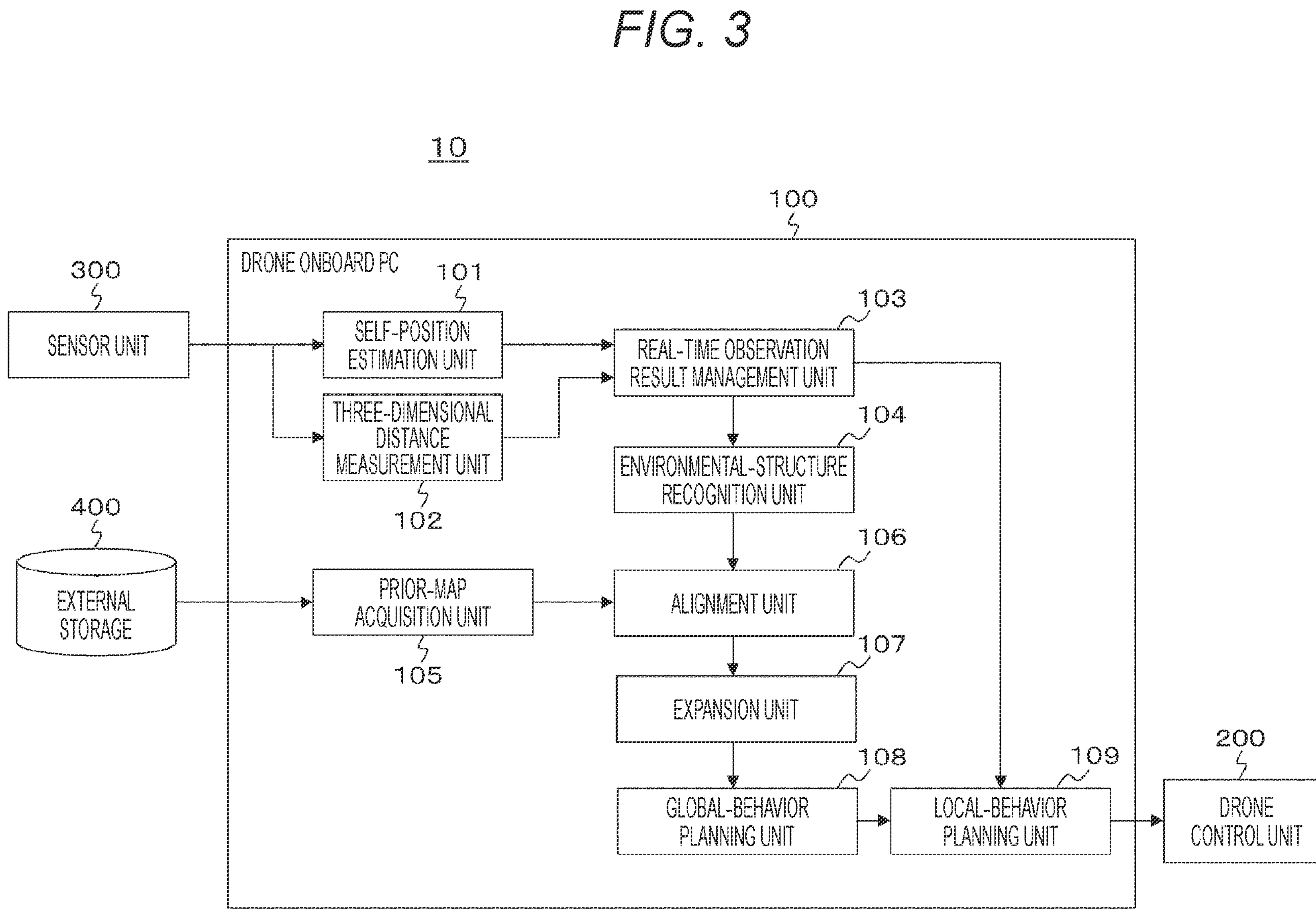
FIG. 3 is a block diagram illustrating an exemplary configuration of the drone.

FIG. 3 illustrates an exemplary configuration of the drone 10. The drone 10 includes a drone onboard PC 100, a drone control unit 200, a sensor unit 300, and an external storage 400.

The sensor unit 200 includes a stereo camera, light detection and ranging (LiDAR), and others. The external storage 400 stores a prior map. The prior map corresponds to a simple two-dimensional or three-dimensional map, a topographical map, a sketch of a building, or the like corresponding to a somewhat wide range in which the drone 10 flies. In this case, the prior map may be stored in the external storage 400 from the beginning, or a necessary range of the prior map may be acquired from a server on a cloud and may be stored in the external storage 400.

The drone onboard PC 100 includes a self-position estimation unit 101, a three-dimensional distance measurement unit 102, a real-time observation result management unit 103, an environmental-structure recognition unit 104, a prior-map acquisition unit 105, an alignment unit 106, an expansion unit 107, a global-behavior planning unit 108, and a local-behavior planning unit 109.

The self-position estimation unit 101 estimates the self-position on the basis of sensor output of the sensor unit 300. In this case, for example, the relative position from the activation position is estimated. The three-dimensional distance measurement unit 103 acquires depth information regarding the surrounding environment on the basis of the sensor output of the sensor unit 300.

The real-time observation result management unit 103 creates a three-dimensional real-time observation result (for example, a three-dimensional occupancy grid map) on the basis of the self-position estimated by the self-position estimation unit 101 and the depth information regarding the surrounding environment obtained by the three-dimensional distance measurement unit 102. In this case, the three-dimensional real-time observation result is generated by adding depth information regarding the surrounding environment together with the self-position.

The environmental-structure recognition unit 104 recognizes an environmental structure on the basis of the three-dimensional real-time observation result generated by the real-time observation result management unit 103. Specifically, plane detection and semantic segmentation are performed on the three-dimensional real-time observation result.

The prior-map acquisition unit 105 acquires, from the external storage 400, a prior map corresponding to the three-dimensional real-time observation result generated by the real-time observation result management unit 103. The range of the prior map in this case needs to be a somewhat wide range including the range of the three-dimensional real-time observation result because the three-dimensional real-time observation result is expanded on the basis of the prior map.

The alignment unit 106 refers to the result of the plane detection or the result of the semantic segmentation obtained by the environmental-structure recognition unit 104. With a well-known alignment technique such as ICP or NDT, the alignment unit 106 corrects the position of the three-dimensional real-time observation result and performs alignment to match with the prior map (see FIG. 2(*b*)).

After the alignment, on the basis of the result of the plane detection or the result of the semantic segmentation obtained by the environmental-structure recognition unit 104, the expansion unit 107 expands the three-dimensional real-time observation result on the basis of the prior map (see FIG. 2(*c*)). In this case, if a space corresponding to the plane detected from the three-dimensional real-time observation result is found in the prior map, the plane is expanded. Then, in this case, if continuity is present in semantics at the connection portion between the three-dimensional real-time observation result and the prior map related to the plane, the plane is expanded.

The global-behavior planning unit 108 makes a global behavior plan on the basis of the expanded three-dimensional real-time observation result obtained by the expansion unit 107 and sets a flight route to the destination. The local-behavior planning unit 109 creates control information necessary for flight along the flight route set in the global behavior plan.

The drone control unit 200 receives the control information obtained by the local-behavior planning unit 109 of the drone onboard PC 100, controls the motor such that the drone 10 flies along the set flight route, and drives the propeller.

Figure 4:
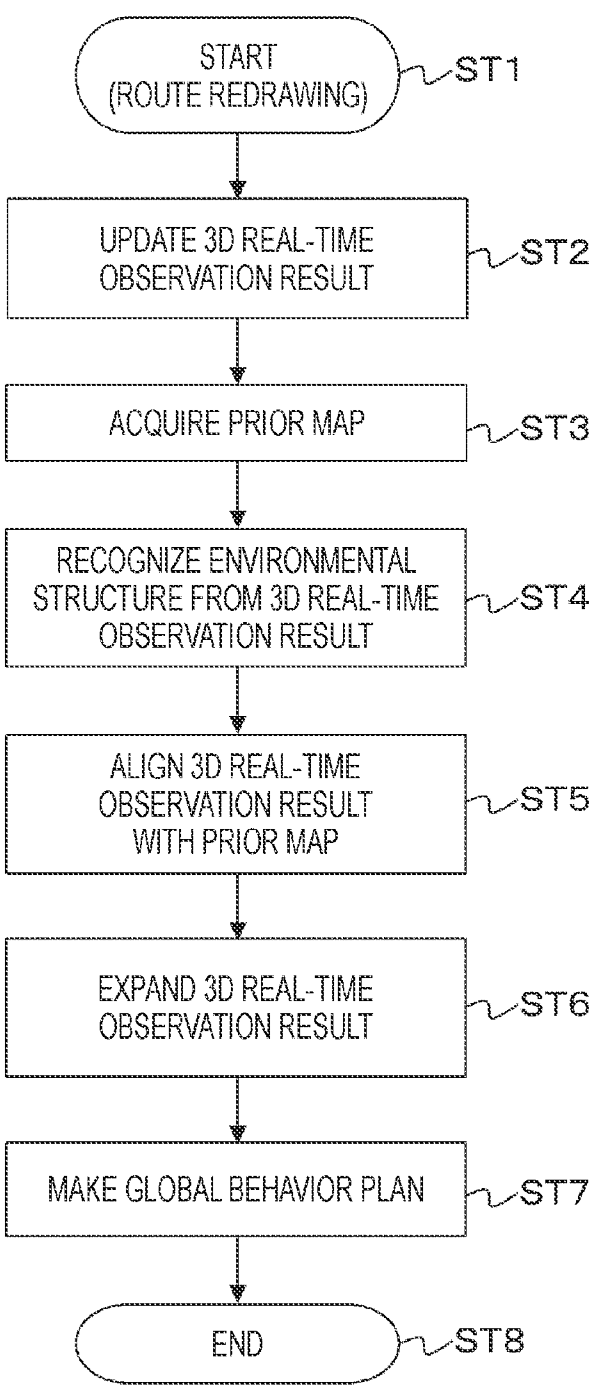
FIG. 4 is a flowchart illustrating an exemplary processing procedure of redrawing a flight route.

The flowchart of FIG. 4 illustrates an exemplary processing procedure of redrawing the flight route. In step ST1, in a case where a flight-route redrawing management unit (not illustrated in FIG. 3) issues an instruction for redrawing the flight route, the drone onboard PC 100 starts the processing. The flight-route redrawing management unit issues an instruction for redrawing, for example, in a case where the flight route is unreasonable, such as a case where an unexpected large obstacle is present on the route set already. Further, the flight-route redrawing management unit issues an instruction for redrawing at certain time intervals or at certain flight distances.

Next, in step ST2, in the drone onboard PC 100, the real-time observation result management unit 103 newly generates a three-dimensional real-time observation result and updates the three-dimensional real-time observation result. Next, in step ST3, in the drone onboard PC 100, the prior-map acquisition unit 105 acquires, from the external storage 400, a two-dimensional or three-dimensional prior map corresponding to the updated real-time observation result.

Next, in step ST4, in the drone onboard PC 100, the environmental-structure recognition unit 104 recognizes an environmental structure from the three-dimensional real-time observation result. Specifically, plane detection and semantic segmentation are performed on the three-dimensional real-time observation result.

Next, in step ST5, in the drone onboard PC 100, the alignment unit 106 refers to the result of the plane detection or the result of the semantic segmentation. With a well-known alignment technique such as ICP or NDT, the alignment unit 106 corrects the position of the three-dimensional real-time observation result and performs alignment to match with the prior map.

Next, in step ST6, in the drone onboard PC 100, on the basis of the result of the plane detection or the result of the semantic segmentation, the expansion unit 107 expands the three-dimensional real-time observation result on the basis of the prior map. In this case, if a space corresponding to the plane detected from the three-dimensional real-time observation result is found in the prior map, the plane is expanded. Then, in this case, if continuity is present in semantics at the connection portion between the three-dimensional real-time observation result and the prior map related to the plane, the plane is expanded.

Next, in step ST7, in the drone onboard PC 100, the global-behavior planning unit 108 makes a global behavior plan on the basis of the expanded three-dimensional real-time observation result, and sets a flight route to the destination. Thereafter, in step ST8, the drone onboard PC 100 ends the flow of processing.

As described above, in the drone 10 illustrated in FIG. 1, the three-dimensional real-time observation result is aligned with the prior map. Thereafter, the three-dimensional real-time observation result is expanded on the basis of the prior map. The global behavior plan is made on the basis of the expanded three-dimensional real-time observation result, and the flight route is set. Therefore, the state of a not-yet observation area can also be grasped in advance from the expanded three-dimensional real-time observation result, and for example, in a flight object such as a drone, a somewhat long flight route can be accurately calculated at a time in the global behavior plan, which enables high-speed autonomous flight of the drone 10.

Figure 5:
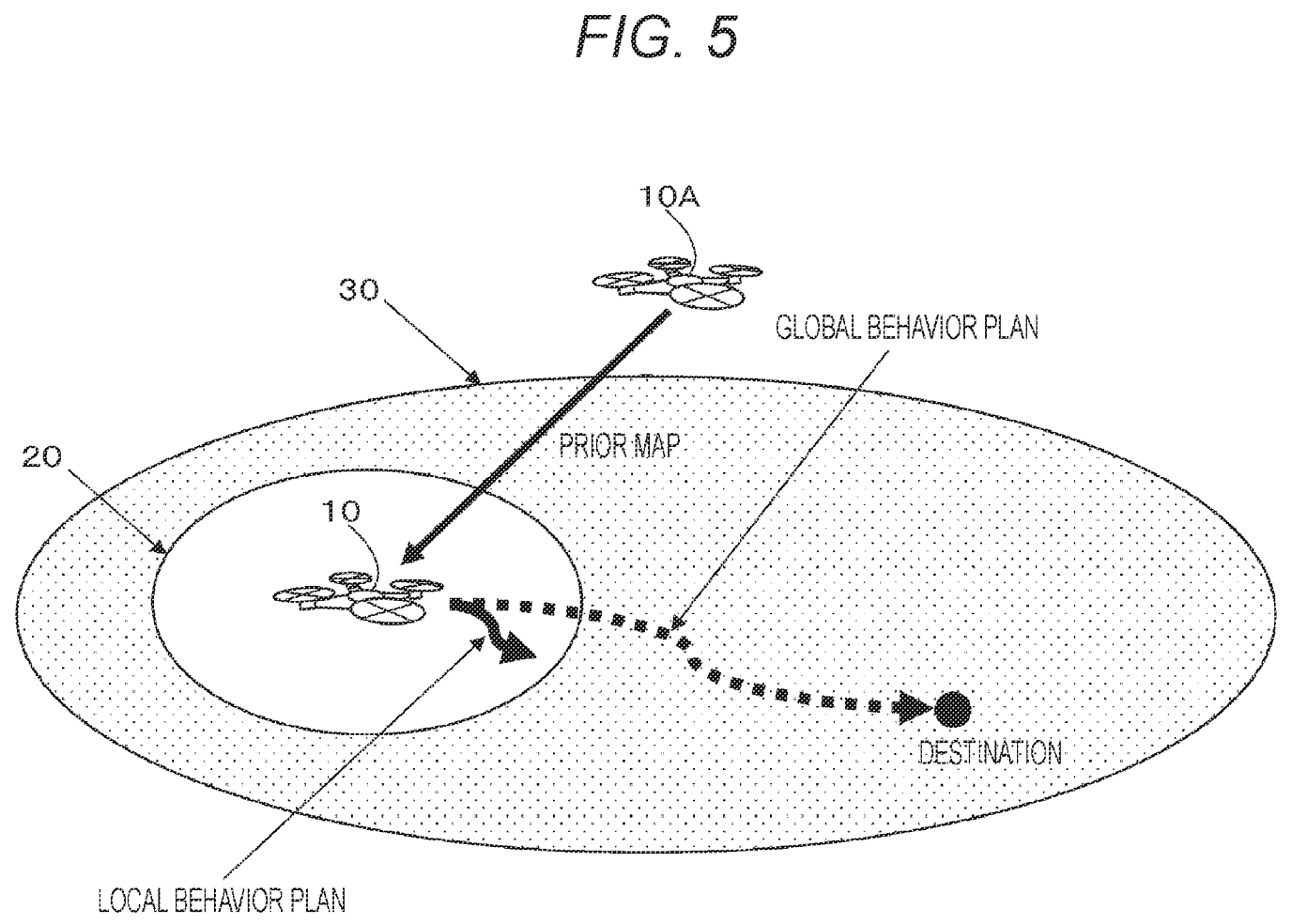

Note that, in the above description, the example has been given in which the drone 10 acquires the prior map from the external storage 400. As another example, it is also conceivable that the drone 10 acquires the prior map from a different drone 10A from the drone 10 through communication. FIG. 5 schematically illustrates a state in that case.

Although detailed description is not given, the drone 10A is similar in configuration to the drone 10. The drone 10A transmits, to the drone 10, a prior map obtained by converting a three-dimensional real-time observation result into a simple map format. For example, the prior map corresponds to a map obtained by processing of cutting a three-dimensional real-time observation result at a certain height and converting the result into a bird's-eye view. Further, for example, the prior map corresponds to a map obtained by processing of reducing the resolution of the three-dimensional real-time observation result to an extent enabling communication.

In the case of the example of FIG. 5, the number of different drones 10A is one. However, the number of different drones 10A that transmit the prior map to the drone 10 is not limited to one, and thus may be two or more. As the number of different drones 10A increases, the range of the prior map to be transmitted to the drone 10 increases.

As described above, transmitting the prior map from the different drone 10A to the drone 10 and sharing the prior map enable effective utilization of the three-dimensional real-time observation result obtained by the different drone 10A. In this case, the dead end or the like confirmed by the different drone 10A can be avoided without being observed by the drone 10.

2. Modifications

Note that, in the above embodiments, the examples have been given in which the flight object is a drone. Although detailed description is not given, the present technology is similarly applicable to other flight objects.

In addition, the preferred embodiments of the present disclosure have been described in detail with reference to the accompanying drawings; however, the technical scope of the present disclosure is not limited to the examples. It is obvious that persons having ordinary knowledge in the technical field of the present disclosure can conceive various types of alternation examples or modification examples within the scope of the technical idea described in the claims, and thus it is also naturally understood that such alternation examples or modification examples belong to the technical scope of the present disclosure.

Further, the effects described in the present specification are merely explanatory or exemplary, and thus are not limitative. That is, the technology according to the present disclosure can exhibit other effects obvious to those skilled in the art from the description of the present specification, together with or instead of the above effects.

Furthermore, the present technology can also adopt the following configurations.

(1) An information processing apparatus including:

a generation unit configured to generate a three-dimensional real-time observation result on the basis of self-position estimation information and three-dimensional distance measurement information;

an acquisition unit configured to acquire a prior map corresponding to the three-dimensional real-time observation result;

an alignment unit configured to align the three-dimensional real-time observation result with the prior map; and an expansion unit configured to expand, after the alignment, the three-dimensional real-time observation result on the basis of the prior map.

(2) The information processing apparatus according to (1) described above, further including:

an environmental-structure recognition unit configured to perform plane detection on the three-dimensional real-time observation result, in which the expansion unit expands, with a result of the plane detection, a plane on the basis of information regarding the prior map.

(3) The information processing apparatus according to (2) described above, in which the environmental-structure recognition unit further performs semantic segmentation on the three-dimensional real-time observation result, and the expansion unit expands, with a result of the semantic segmentation, the plane in a case where continuity is present in semantics.

(4) The information processing apparatus according to any of (1) to (3) described above, in which the three-dimensional real-time observation result corresponds to a three-dimensional occupancy grid map.

(5) An information processing method including:

a procedure of generating a three-dimensional real-time observation result on the basis of self-position estimation information and three-dimensional distance measurement information;

a procedure of acquiring a prior map corresponding to the three-dimensional real-time observation result;

a procedure of aligning the three-dimensional real-time observation result with the prior map; and a procedure of expanding, after the aligning, the three-dimensional real-time observation result on the basis of the prior map.

(6) A program causing a computer to function as:

generation means configured to generate a three-dimensional real-time observation result on the basis of self-position estimation information and three-dimensional distance measurement information;

acquisition means configured to acquire a prior map corresponding to the three-dimensional real-time observation result;

alignment means configured to align the three-dimensional real-time observation result with the prior map; and expansion means configured to expand, after the alignment, the three-dimensional real-time observation result on the basis of the prior map.

(7) A flight object including:

a generation unit configured to generate a three-dimensional real-time observation result on the basis of self-position estimation information and three-dimensional distance measurement information;

an acquisition unit configured to acquire a prior map corresponding to the three-dimensional real-time observation result;

an alignment unit configured to align the three-dimensional real-time observation result with the prior map;

an expansion unit configured to expand, after the alignment, the three-dimensional real-time observation result on the basis of the prior map; and a behavior planning unit configured to set a flight route on the basis of the three-dimensional real-time observation result having been expanded.

(8) The flight object according to (7) described above, in which the acquisition unit acquires the prior map from a different flight object from the flight object through communication.

(9) The flight object according to (8) described above, in which the prior map corresponds to a map based on the three-dimensional real-time observation result generated by the different flight object.

(10) The flight object according to (9) described above, in which the prior map corresponds to a map obtained by processing of cutting the three-dimensional real-time observation result at a certain height and converting the cut three-dimensional real-time observation result into a bird's-eye view.

(11) The flight object according to (9) described above, in which the prior map corresponds to a map obtained by processing of reducing resolution of the three-dimensional real-time observation result to an extent enabling the communication.

(12) The flight object according to any of (7) to (11) described above, further including:

an environmental-structure recognition unit configured to perform plane detection on the three-dimensional real-time observation result, in which the expansion unit expands, with a result of the plane detection, a plane on the basis of information regarding the prior map.

(13) The flight object according to (12) described above, in which the environmental-structure recognition unit further performs semantic segmentation on the three-dimensional real-time observation result, and the expansion unit expands, with a result of the semantic segmentation, the plane in a case where continuity is present in semantics.

REFERENCE SIGNS LIST

10, 10A Drone
20 Observation area
30 Not-yet observation area
100 Drone onboard PC
101 Self-position estimation unit
102 Three-dimensional distance measurement unit
103 Real-time observation result management unit
104 Environmental-structure recognition unit
105 Prior-map acquisition unit
106 Alignment unit
107 Expansion unit
108 Global-behavior planning unit
109 Local-behavior planning unit
200 Drone control unit
300 Sensor unit
400 External storage

The invention claimed is:

1. An information processing apparatus comprising:

circuitry configured to generate a three-dimensional real-time observation result based on self-position estimation information and three-dimensional distance measurement information obtained from a sensor, acquire a prior map corresponding to the three-dimensional real-time observation result, align the three-dimensional real-time observation result with the prior map, expand the three-dimensional real-time observation result based on the prior map, and determine a flight route based on the three-dimensional real-time observation result having been expanded, wherein the prior map includes information related to recognized environmental structure including at least one of a topography, a wall, or a building, wherein the circuitry is further configured to expand the three-dimensional real-time observation result corresponding to semantic segmentation of the recognized environmental structure so that an expanded area of the three-dimensional real-time result is continuous for same semantics within and outside a detection range of the sensor, and wherein the circuitry is further configured to perform the semantic segmentation on the three-dimensional real-time observation result to determine whether continuity is present in semantics at a connection portion with respect to previously performed semantic segmentation of the prior map in relation to the recognized environmental structure, and expand, with a result of the semantic segmentation, a plane at the connection portion.

2. The information processing apparatus according to claim 1, wherein the circuitry is configured to expand the three-dimensional real-time observation result in an unobservable area.

3. The information processing apparatus according to claim 1, wherein the circuitry is further configured to perform plane detection on the three-dimensional real-time observation result, and expand, with a result of the plane detection, the plane based on information regarding the prior map.

4. The information processing apparatus according to claim 1, wherein the three-dimensional real-time observation result corresponds to a three-dimensional occupancy grid map.

5. The information processing apparatus according to claim 1, wherein the circuitry is configured to acquire the prior map from a different information processing apparatus through communication.

6. The information processing apparatus according to claim 5, wherein the prior map corresponds to a map based on the three-dimensional real-time observation result generated by the different information processing apparatus.

7. The information processing apparatus according to claim 1, wherein the prior map corresponds to a map obtained by processing of cutting the three-dimensional real-time observation result at a certain height and converting the cut three-dimensional real-time observation result into a bird's-eye view.

8. The information processing apparatus according to claim 5, wherein the prior map corresponds to a map obtained by processing of reducing resolution of the three-dimensional real-time observation result to an extent enabling the communication.

9. An information processing method comprising:

generating a three-dimensional real-time observation result based on self-position estimation information and three-dimensional distance measurement information obtained from a sensor;

acquiring a prior map corresponding to the three-dimensional real-time observation result;

aligning the three-dimensional real-time observation result with the prior map; and expanding the three-dimensional real-time observation result based on the prior map; and determining a flight route based on the three-dimensional real-time observation result having been expanded, and wherein the prior map includes information related to recognized environmental structure including at least one of a topography, a wall, or a building, wherein the expanding of the three-dimensional real-time observation result corresponds to semantic segmentation of the recognized environmental structure so that an expanded area of the three-dimensional real-time result is continuous for same semantics within and outside a detection range of the sensor, and wherein the method further comprises:

performing the semantic segmentation on the three-dimensional real-time observation result to determine whether continuity is present in semantics at a connection portion with respect to previously performed semantic segmentation of the prior map in relation to the recognized environmental structure; and expanding, with a result of the semantic segmentation, a plane at the connection portion.

10. A flight object comprising:

circuitry configured to generate a three-dimensional real-time observation result based on self-position estimation information and three-dimensional distance measurement information obtained from a sensor, acquire a prior map corresponding to the three-dimensional real-time observation result, align the three-dimensional real-time observation result with the prior map, expand the three-dimensional real-time observation result based on the prior map, and determine a flight route based on the three-dimensional real-time observation result having been expanded, wherein the prior map includes information related to recognized environmental structure including at least one of a topography, a wall, or a building, wherein the expanding of the three-dimensional real-time observation result corresponds to semantic segmentation of the recognized environmental structure so that an expanded area of the three-dimensional real-time result is continuous for same semantics within and outside a detection range of the sensor, and wherein the circuitry is further configured to perform the semantic segmentation on the three-dimensional real-time observation result to determine whether continuity is present in semantics at a connection portion with respect to previously performed semantic segmentation of the prior map in relation to the recognized environmental structure, and expand, with a result of the semantic segmentation, a plane at the connection portion.

11. The flight object according to claim 10, wherein the circuitry is configured to acquire the prior map from a different flight object from the flight object through communication.

12. The flight object according to claim 11, wherein the prior map corresponds to a map based on the three-dimensional real-time observation result generated by the different flight object.

13. The flight object according to claim 10, wherein the prior map corresponds to a map obtained by processing of cutting the three-dimensional real-time observation result at a certain height and converting the cut three-dimensional real-time observation result into a bird's-eye view.

14. The flight object according to claim 10, wherein the prior map corresponds to a map obtained by processing of reducing resolution of the three-dimensional real-time observation result to an extent enabling the communication.

15. The flight object according to claim 10, wherein the circuitry is further configured to perform plane detection on the three-dimensional real-time observation result, and expand, with a result of the plane detection, the plane based on information regarding the prior map.

* * * * *